US012773046B2

(12) United States Patent
Woods et al.

(10) Patent No.: US 12,773,046 B2
(45) Date of Patent: Oct. 27, 2026

(54) ADJUSTABLE WRITING BOARD

(71) Applicants: Evelyn Woods, Belize City (BZ); Carla Woods, Los Angeles, CA (US)

(72) Inventors: Evelyn Woods, Belize City (BZ); Carla Woods, Los Angeles, CA (US)

(*) Notice: Subject to any disclaimer, the term of this patent is extended or adjusted under 35 U.S.C. 154(b) by 0 days.

(21) Appl. No.: 18/300,200

(22) Filed: Apr. 13, 2023

(65) Prior Publication Data

US 2023/0248150 A1 Aug. 10, 2023

Related U.S. Application Data

(63) Continuation-in-part of application No. 16/784,995, filed on Feb. 7, 2020, now abandoned.

(51) Int. Cl.

*A47B 97/00* (2006.01)
*F16M 11/04* (2006.01)
*F16M 13/02* (2006.01)

(52) U.S. Cl.

CPC ......... *A47B 97/001* (2013.01); *F16M 11/046* (2013.01); *F16M 13/022* (2013.01); *A47B 2220/0022* (2013.01); *F16M 2200/027* (2013.01)

(58) Field of Classification Search

CPC .................. A47B 17/02; A47B 97/001; A47B 2220/0022; F16M 11/046; F16M 11/022
USPC .... 40/601; 312/319.4–319.8, 334.45, 334.46
See application file for complete search history.

(56) References Cited

U.S. PATENT DOCUMENTS

| | | | | | |
|---|---|---|---|---|---|
| 2,161,587 | A | * | 6/1939 | Pettis | B43L 1/04 434/413 |
| 2,528,311 | A | * | 10/1950 | Hurley | G03B 21/58 434/420 |
| 2,730,423 | A | * | 1/1956 | Mock | A47B 88/57 312/334.22 |
| 2,761,640 | A | * | 9/1956 | Frater | A47B 97/001 434/420 |
| 2,825,152 | A | * | 3/1958 | Baylon | G09F 7/22 434/421 |
| 2,987,832 | A | * | 6/1961 | Urbain | B43L 1/06 434/420 |
| 3,107,442 | A | * | 10/1963 | Levine | A47B 83/008 D19/114 |
| 3,261,113 | A | * | 7/1966 | March | A47B 97/04 434/420 |
| 3,610,562 | A | * | 10/1971 | Holmes | G09F 7/205 434/420 |

(Continued)

*Primary Examiner* — Daniel J Troy
*Assistant Examiner* — Timothy M Ayres
(74) *Attorney, Agent, or Firm* — Elizabeth Yang

(57) ABSTRACT

An adjustable writing board includes a planar member having a front face, a rear face opposed to the front face, two side edges slidably engaged with a first station and a second station respectively; a selective third station slidably engaged with a middle portion of the planar member; a selective remote control panel electrically connected with the first station, the second station, and/or the third station to control operations thereof; wherein each of the first station, the second station, and/or the third station comprises a locking mechanism having a slide guiding rail, a wheel roller slidably received in the slide guiding rail, and a plurality of spring-loaded stoppers, which can retract and contract to block and release the wheel roller.

20 Claims, 8 Drawing Sheets

(56) References Cited

U.S. PATENT DOCUMENTS

| | | | | | |
|---|---|---|---|---|---|
| 4,121,878 | A * | 10/1978 | Lokken | A47B 88/467 312/334.45 |
| 4,536,163 | A * | 8/1985 | Schnirch | A47B 97/001 434/420 |
| 5,242,222 | A * | 9/1993 | Michael | A47L 15/507 312/334.45 |
| 5,718,083 | A * | 2/1998 | Dowdell, II | E05F 5/003 312/334.46 |
| 5,823,649 | A * | 10/1998 | Hinrichs | E05B 65/0014 312/334.47 |
| 6,116,504 | A * | 9/2000 | Ariga | G07G 1/0027 235/22 |
| 8,069,598 | B2 * | 12/2011 | Garcia | G09F 7/18 353/69 |
| 8,276,864 | B2 * | 10/2012 | Ye | F16M 11/04 248/924 |
| 8,641,007 | B2 * | 2/2014 | Chen | F16M 11/28 248/458 |
| 9,398,809 | B2 * | 7/2016 | Ross | G06F 1/16 |
| 9,548,007 | B2 * | 1/2017 | Schmidt | F16M 11/425 |
| 10,694,924 | B1 * | 6/2020 | Hansen | A47L 15/507 |
| 11,849,846 | B1 * | 12/2023 | Hewatt | A47B 96/067 |
| 2009/0101608 | A1 * | 4/2009 | Sloat | A47B 97/001 211/94.01 |
| 2013/0127306 | A1 * | 5/2013 | Head | A47B 81/06 312/204 |

* cited by examiner

ADJUSTABLE WRITING BOARD

CROSS-REFERENCES TO RELATED APPLICATIONS

This non-provisional application claims priority under 35 U.S.C. § 119(a) on U.S. Non-Provisional patent application Ser. No. 16/784,995 filed on Feb. 7, 2020, the entire contents of which are hereby incorporated by reference.

FIELD OF THE DISCLOSURE

The present disclosure relates to a writing board, and more particularly, an adjustable writing board with an adjusting mechanism adopted to adjust the positions and levels of the writing board.

BACKGROUND OF THE DISCLOSURE

Writing boards are well-known in the art. However, they often do not provide for height adjustment which are easier for teachers and students, some of the apparatus available for adjustment are cumbersome, complex and expensive. Prior to the present invention, the writing board cannot be neither easily moved manually nor controlled remotely to adjust the positions and levels.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The disclosed embodiments may seek to satisfy one or more of the above-mentioned desires. Although the present embodiments may obviate one or more of the above-mentioned desires, it should be understood that some aspects of the embodiments might not necessarily obviate them

BRIEF SUMMARY OF THE DISCLOSURE

In a general implementation, an adjustable writing board comprises a planar member having a front face, a rear face opposed to the front face, two side edges slidably engaged with a first station and a second station respectively; a selective remote control panel electrically connected with the first station and the second station to control operations thereof; wherein each of the first station, the second station comprises a locking mechanism having a slide guiding rail, a wheel roller slidably received in the slide guiding rail, and a plurality of stoppers, which can retract and contract to block and release the wheel roller.

In another aspect combinable with the general implementation, the planar member is manually and horizontally moved by hand from top to bottom along the first and the second stations.

In another aspect combinable with the general implementation, at least one of the two side edges of the planar member are vertically moved along the first and second stations.

In another aspect combinable with the general implementation, further comprising a third station slidably engaged with a middle portion of the planar member.

In another aspect combinable with the general implementation, at least one of the two side edges and the middle portion of the planar member are syncronizedly moved along the first, the second, and the third stations at the same level.

In another aspect combinable with the general implementation, at least one of the first station, the second station, and/or the third station are affixed on a wall.

In another aspect combinable with the general implementation, further comprising a supporting stand affixed around a periphery of the planar member to support the planar member on a ground.

In another aspect combinable with the general implementation, the supporting stand is affixed along a bottom edge and two side edges of the planar member.

In another aspect combinable with the general implementation, the first station and the second station are arranged between the two side edges of the planar member and the supporting stand.

In another aspect combinable with the general implementation, further comprising a press button on at least one of the first station, the second station, and/or the third station.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above and below as acting in certain combinations and even initially claimed as such, one or more features from a claimed combination can in some cases be excised from the combination, and the claimed combination may be directed to a subcombination or variation of a subcombination.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION OF THE EMBODIMENTS

Figure 1:
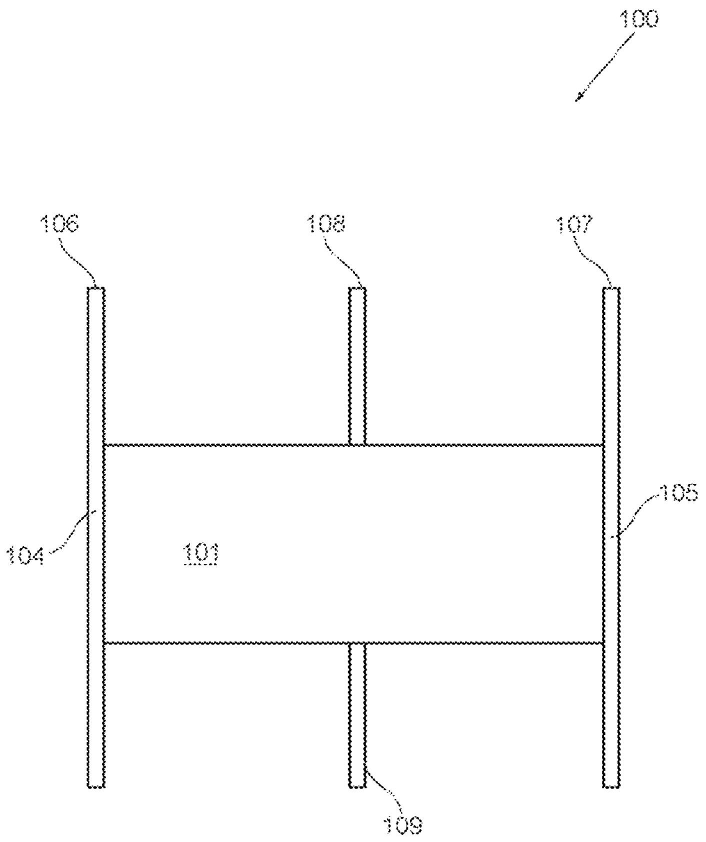
FIG. 1 is the front view of the adjustable writing board as described in one embodiment of the present invention.

Many alterations and modifications may be made by those having ordinary skill in the art without departing from the spirit and scope of the disclosed embodiments. Therefore, it must be understood that the illustrated embodiments have been set forth only for the purposes of example and that it should not be taken as limiting the embodiments as defined by the following claims. For example, notwithstanding the fact that the elements of a claim are set forth below in a certain combination, it must be expressly understood that the embodiment includes other combinations of fewer, more or different elements, which are disclosed herein even when not initially claimed in such combinations.

Thus, specific embodiments and applications of the adjustable writing board have been disclosed. It should be apparent, however, to those skilled in the art that many more modifications besides those already described are possible without departing from the disclosed concepts herein. The disclosed embodiments, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalents within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiments. In addition, where the specification and claims refer to at least one of something selected from the group consisting of A, B, C . . . and N, the text should be interpreted as requiring at least one element from the group which includes N, not A plus N, or B plus N, etc.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for anyone of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

FIG. 1 generally depicts the basic architecture of an adjustable writing board in accordance with the one of the disclosed embodiments.

In one embodiment, an adjustable writing board 100 comprises a planar member 101 having a front face 102, a rear face 103 opposed to the front face, two side edges 104 and 105 slidably engaged with a first station 106 and a second station 107 respectively; a third station 108 slidably engaged with a middle portion of the planar member 101; a remote control panel electrically connected with the first station 106, the second station 107, and the third station 108 to control operations thereof; wherein each of the first station 106, the second station 107, and the third station 108 comprises a slide guiding rail 109 and a wheel roller slidably received in the slide guiding rail.

When the writing board 100 are in use, at least one of the first station 106, the second station 107, and the third station 108 may be affixed on a wall. For example, the planar member 101 of the writing board 100 may be eight feet in length and four feet in height, which may be either a chalk or white board. Each station may be eight feet in height, vertically installed one foot above the ground. The length and height may be adjusted according to the using situation and by ordinary means.

When adjusting the position of the writing board 100, at least one of the two side edges 104 and 105 of the planar member 101 are vertically moved along the first station 106 and second station 107, at least one of the two side edges 104 and 105 and the middle portion of the planar member 101 are syncronizedly moved along the first station 106, the second station 107, and the third station 108 at the same level.

Figure 2:
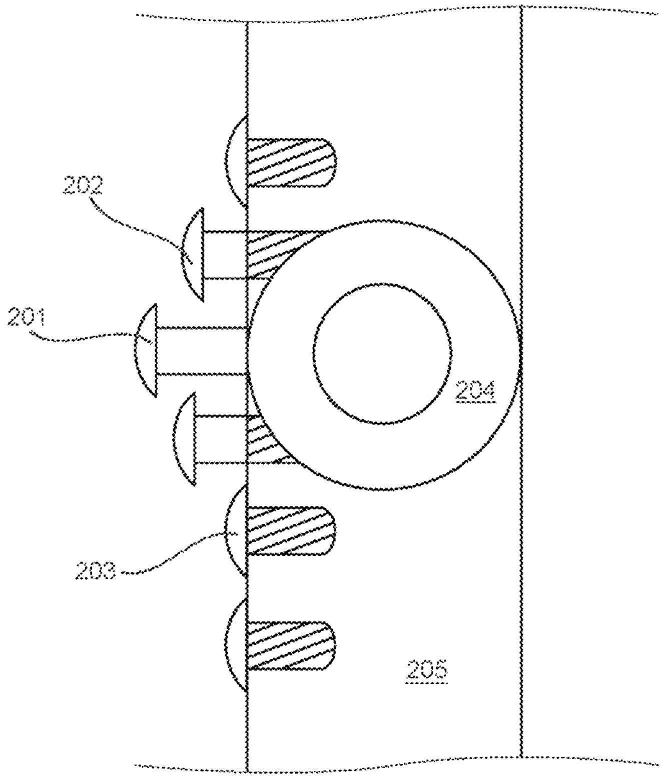
FIG. 2 is the side view of the adjustable writing board showing the slide guiding rail, the wheel roller and the stoppers as described in one embodiment of the present invention.

FIG. 2 demonstrates the side view of the adjustable writing board, specifically a locking mechanism 200 having a slide guiding rail 205, a wheel roller 204 slidably received in the slide guiding rail 205, and a plurality of stoppers (201-203), which can retract and contract to block and release the wheel roller 204. Wheel roller 204 rolls up and down inside the slide guide rail 205 until in desired position. The slide guide rail 205 guides the writing board up and down in a fixed position. That is, by manually pushing or pulling the planar member 101 up and down, the wheel roller 204 will also roll up and down inside the slide guide rail 205 until the planar member 101 is in desired position.

Figure 8:
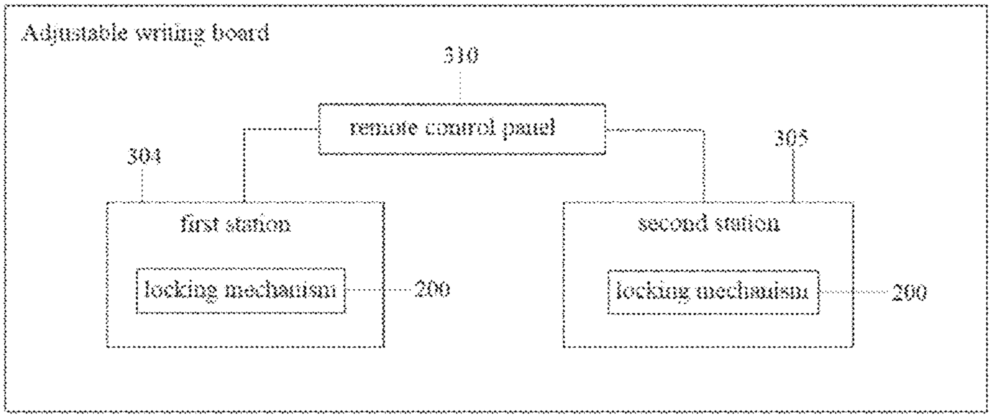
FIG. 8 is the block diagram of the adjustable writing board showing the connection of the control panel as described in another embodiment of the present invention.

Please also refer to FIG. 8, which demonstrates how a remote control panel connect with the components on adjustable writing board. When the writing board are adjusted by the remote control panel 310 which electrically connected with a first station 304, a second station 305, and a selective third station to control operation, the stopper 201 retracts when under pressure from the wheel roller 204, the stopper 202 contracts when not under pressure from the wheel roller 204. In detail, the remote control panel 310 is connected to a motor (not shown in the figure), which located in/on the adjustable writing board, and the remote control panel 310 will control the motor to drive the wheel roller 204 to move up and down in the slide guiding rail 205. In this embodiment, the remote control panel 310 is located on the planar member 101, but it can also located on the first station 106 and second station 107.

Figure 7:
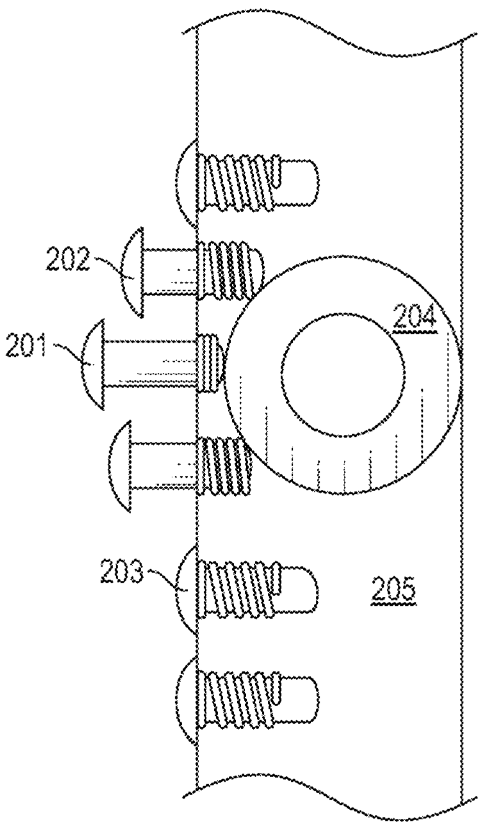
FIG. 7 is side view of the adjustable writing board showing the slide guiding rail, the wheel roller and the spring-loaded stoppers as described in one embodiment of the present invention.

Please refer to FIG. 7 demonstrates the side view of the adjustable writing board in another embodiment. FIG. 7 shows the stoppers 203 can also be spring-loaded, and the spring-loaded stopper 203 keeps the writing board in desired position. In other words, because the spring is loaded on each of the stoppers (201-203), the wheel roller 204 cannot overcome the spring's elastic recovery force and move up and down without applying external force. Therefore, the wheel roller 204 will be stuck by the stoppers 203 and cannot adjust the height for the writing board. However, when an external force is applied to the wheel roller 204, such as manually pushing or pulling the planar member 101 up and down or the remote control panel 310 controls the motor to drive the wheel roller 204 to move up and down, the stopper 201 in the moving direction of the roller will be pushed outward, causing the spring on it to be compressed so that the wheel roller 204 can pass through, and when the wheel roller 204 leaves, the stopper 202 returns to its original position through the elastic recovery force of spring.

Figure 3:
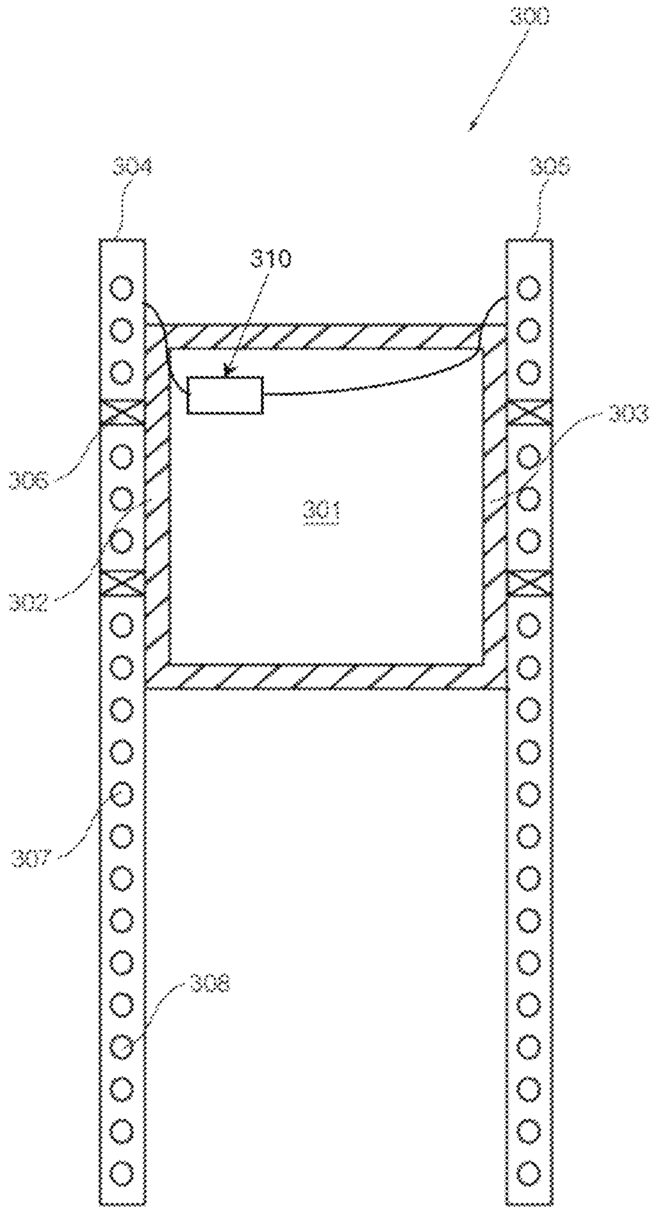
FIG. 3 is the front view of the adjustable writing board showing the board locking in desired position as described in one embodiment of the present invention.

FIG. 3 demonstrates the front view of the adjustable writing board 300, wherein the writing board 300 locking in desired position for teacher, student or child. When the writing board 300 are adjusted by a remote control panel which electrically connected with the first station 304 and the second station 305 to control operation, at least one of the two side edges 302 and 303 of the planar member 301 are vertically moved along the first station 304 and second station 305, the two side edges 302 and 303 of the planar member 301 are syncronizedly moved along the first station 304 and the second station 305 at the same level, during the movement, the stopper 306 retracts when under pressure from the wheel roller 308, the stopper 307 contracts when not under pressure from the wheel roller 308.

Figure 4:
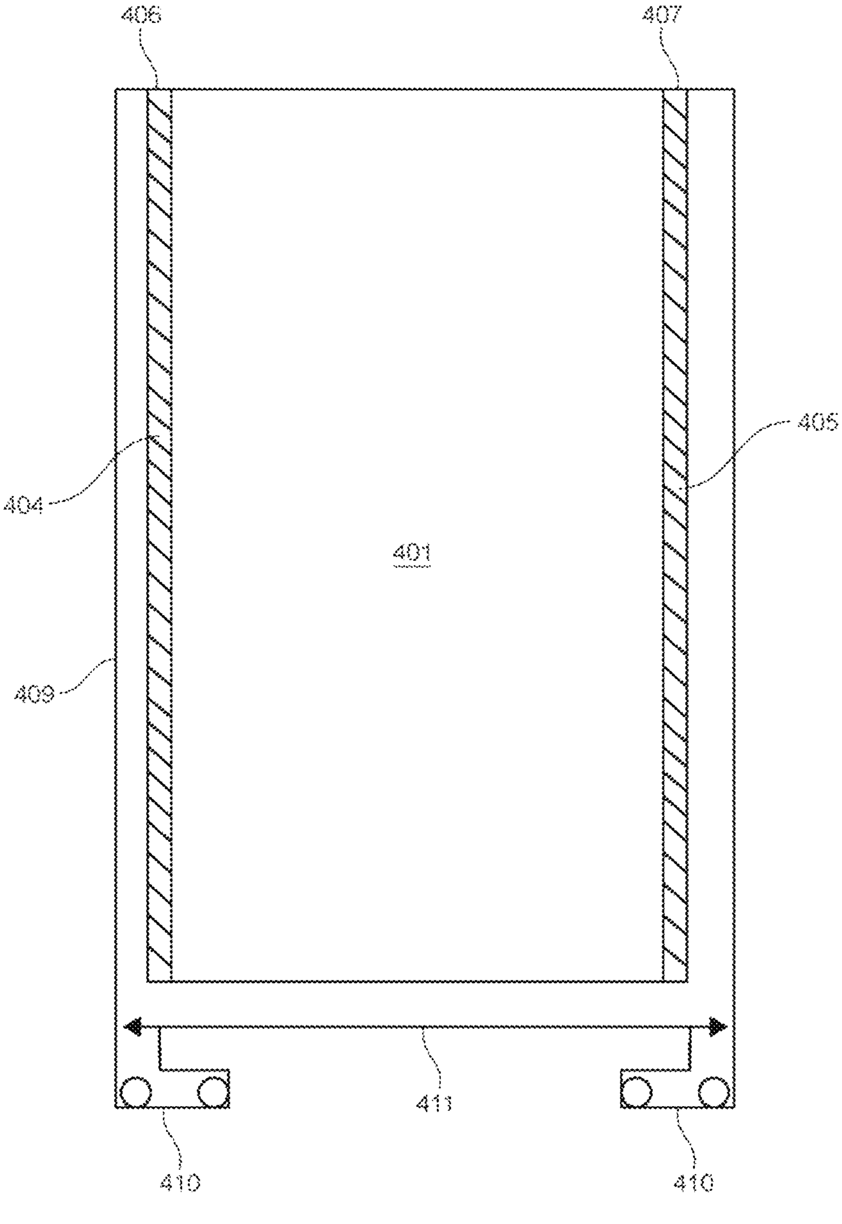
FIG. 4 is the front view of the adjustable writing board as described in a second embodiment of the present invention.

FIG. 4 demonstrates the front view of the adjustable writing board 400 as described in a second embodiment of the invention. An portable adjustable writing board 400 comprises a planar member 401 having a front face 402, a rear face 403 opposed to the front face, two side edges 404 and 405 slidably engaged with a first station 406 and a second station 407 respectively; a remote control panel electrically connected with the first station 406, and the second station 407 to control operations thereof; wherein each of the first station 406, and the second station 407 comprises a slide guiding rail 409 and a wheel roller 408 slidably received in the slide guiding rail 409.

As shown in FIG. 4, the board comprises supporting stands 410 affixed around a periphery of the planar member 401 to support the planar member on a ground. The supporting stands 410 are affixed along a bottom edge 411 and two side edges of the planar member 404 and 405. The first station 406 and the second station 407 are arranged between the two side edges 404 and 405 of the planar member 401 and the supporting stands 410.

For example, the portable adjusting writing board 400 may be ten feet in height, wherein the planar member 401 may be six feet in length and four feet in height, which may be either a chalk or white board. Each station may be nine feet in height, vertically installed one feet above the bottom of supporting stands 410. Two supporting stands 410 are affixed along the bottom edge 411 and two side edges of the planar member 404 and 405 respectively, each with a plural of wheels for movement. The length and height may be adjusted according to the using situation and by ordinary means. Therefore, the writing board may be moved and supported on a ground when needed, at the mean time may be adjusted up and down by the remote control panel to a desired position.

Figure 5:
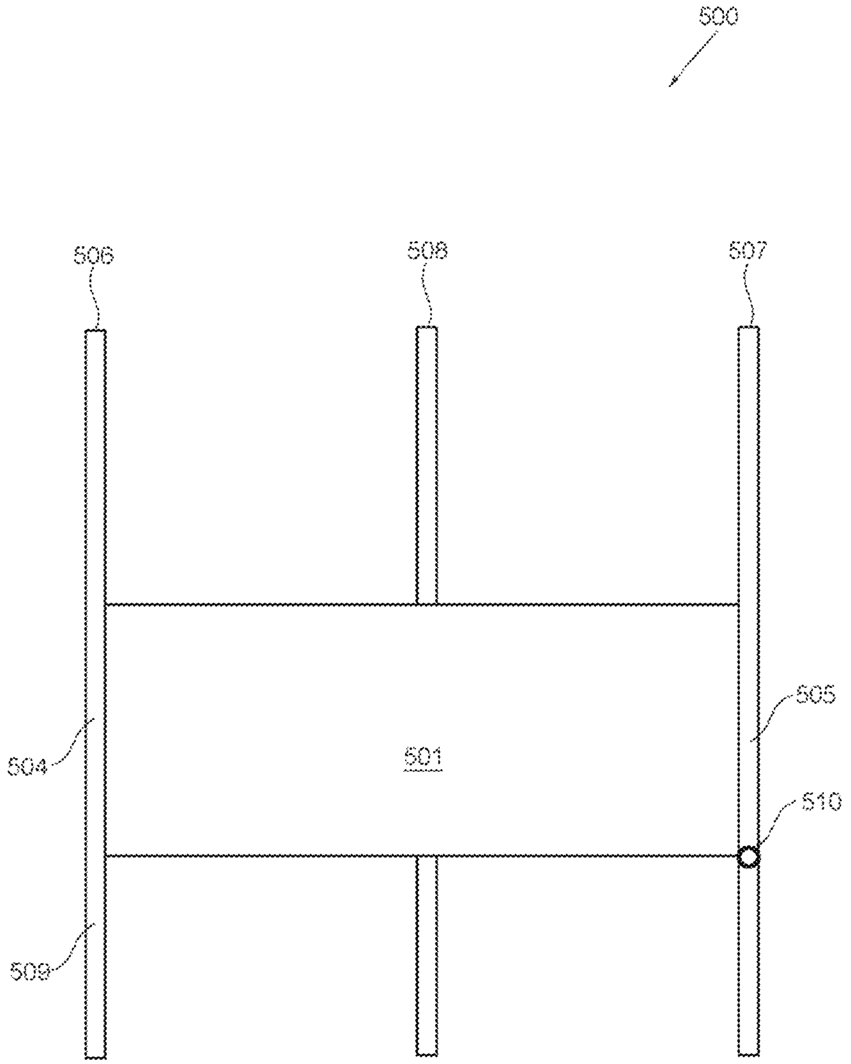
FIG. 5 is the front view of the adjustable writing board as described in another embodiment of the present invention.

In another embodiment as shown in FIG. 5, an adjustable writing board 500 comprises a planar member 501 having a front face 502, a rear face 503 opposed to the front face, two side edges 504 and 505 slidably engaged with a first station 506 and a second station 507 respectively; a third station 508 slidably engaged with a middle portion of the planar member 501; wherein each of the first station 506, the second station 507, and the third station 508 comprises a slide guiding rail 509, a wheel roller slidably received in the slide guiding rail, and a press button 510 on the second station 507 to keep the writing board in desired position.

When the writing board 500 are in use, at least one of the first station 506, the second station 507, and the third station 508 may be affixed on a wall. For example, the planar member 501 of the writing board 500 may be eight feet in length and four feet in height, which may be either a chalk or white board. Each station may be eight feet in height, vertically installed one foot above the ground. The length and height may be adjusted according to the using situation and by ordinary means.

When the planar member 501 is manually and horizontally moved by hand from top to bottom along the first station 506 and the second station 507, at least one of the two side edges 504 and 505 of the planar member 501 are vertically moved along the first station 506 and second station 507, at least one of the two side edges 504 and 505 and the middle portion of the planar member 501 are syncronizedly moved along the first station 506, the second station 507, and the third station 508 at the same level. When the writing board is in desired position, pressing button 510 to keeps the planar member 501 stay in this position.

Figure 6:
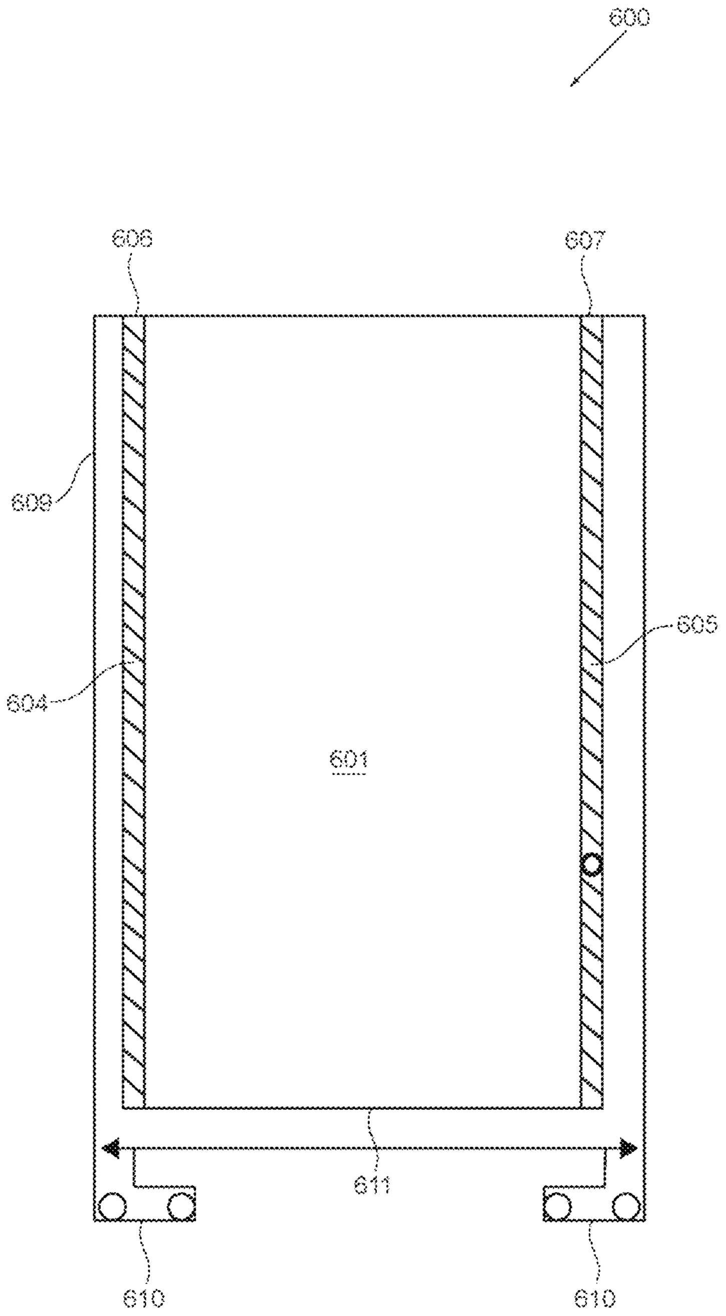
FIG. 6 is the front view of the adjustable writing board as described in another embodiment of the present invention.

FIG. 6 demonstrates the front view of the adjustable writing board 600 as described in another embodiment of the invention. An portable adjustable writing board 600 comprises a planar member 601 having a front face 602, a rear face 603 opposed to the front face 602, two side edges 604 and 605 slidably engaged with a first station 606 and a second station 607 respectively; wherein each of the first station 606, and the second station 607 comprises a slide guiding rail 609 and a wheel roller 608 slidably received in the slide guiding rail 609; and a press button 610 on the second station 607 to keep the writing board in desired position.

As shown in FIG. 6, the board comprises supporting stands 610 affixed around a periphery of the planar member 601 to support the planar member on a ground. The supporting stands 610 are affixed along a bottom edge 611 and two side edges of the planar member 604 and 605. The first station 606 and the second station 607 are arranged between the two side edges 604 and 605 of the planar member 601 and the supporting stands 610.

For example, the portable adjusting writing board 600 may be ten feet in height, wherein the planar member 601 may be six feet in length and four feet in height, which may be either a chalk or white board. Each station may be nine feet in height, vertically installed one feet above the bottom of supporting stands 610. Two supporting stands 610 are affixed along the bottom edge 611 and two side edges of the planar member 604 and 605 respectively, each with a plural of wheels for movement. The length and height may be adjusted according to the using situation and by ordinary means. Therefore, the writing board may be moved and supported on a ground when needed, at the mean time may be manually adjusted up and down to a desired position, then pressing button 610 to keeps the planar member 601 stay in this position.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An adjustable writing board, comprising:

a planar member having a front face:

a rear face opposed to the front face; and two side edges slidably engaged with a first station of the planar member and a second station of the planar member, respectively, wherein each of the first station and the second station comprises a locking mechanism having a slide guiding rail, a wheel roller slidably received in the slide guiding rail, and a plurality of at least four stoppers configured to block and release the wheel roller, wherein the plurality of stoppers are spring loaded, and wherein the plurality of stoppers is further configured to retract under pressure from the wheel roller and block the wheel roller, when the wheel roller roll toward the plurality of stoppers, and contract after the wheel roller pass the plurality of stoppers, wherein two or more stoppers are in contact with the wheel roller; and a third station slidably engaged with a middle portion of the planar member, wherein the two side edges and the middle portion of the planar member are moved along the first station, the second station, and the third station at same level.

2. The adjustable writing board according to claim 1, wherein the two side edges of the planar member are vertically moved along the first station and the second station.

3. The adjustable writing board according to claim 1, wherein at least one of the first station or the second station are affixed on a wall.

4. The adjustable writing board according to claim 1, further comprising one or more supporting stands affixed around a periphery of the planar member.

5. The adjustable writing board according to claim 4, wherein the one or more supporting stands are affixed along a bottom edge of the planar member and the two side edges of the planar member.

6. The adjustable writing board according to claim 5, wherein the first station and the second station are between the two side edges of the planar member and the one or more supporting stands.

7. The adjustable writing board according to claim 1, further comprising a press button on at least one of the first station or the second station.

8. The adjustable writing board according to claim 1, wherein each of the first station and the second station comprises at least five stoppers configured to block and release the wheel roller.

9. The adjustable writing board according to claim 1, wherein three or more stoppers are in contact with the wheel roller.

10. An adjustable writing board, comprising:

a planar member having a front face:

a rear face opposed to the front face; and two side edges slidably engaged with a first station of the planar member and a second station of the planar member, respectively, wherein each of the first station and the second station comprises a locking mechanism having a slide guiding rail, a wheel roller slidably received in the slide guiding rail, and a plurality of at least four stoppers configured to block and release the wheel roller;

wherein two or more stoppers are in contact with the wheel roller; and wherein a remote control panel electrically connected in the first station and the second station, wherein the remote control panel is configured to control operations of the wheel rollers and wherein the remote control panel is located on the planar member; and a third station slidably engaged with a middle portion of the planar member, wherein the two side edges and the middle portion of the planar member are moved along the first station, the second station, and the third station at same level.

11. The adjustable writing board according to claim 10, wherein the planar member is configured to horizontally move from top to bottom along the first station and the second station based on an external force.

12. The adjustable writing board according to claim 11, wherein the two side edges of the planar member are vertically moved along the first station and the second station.

13. The adjustable writing board according to claim 10, wherein at least one of the first station or the second station are affixed on a wall.

14. The adjustable writing board according to claim 10, further comprising one or more supporting stands affixed around a periphery of the planar member.

15. The adjustable writing board according to claim 14, wherein the one or more supporting stands are affixed along a bottom edge of the planar member and the two side edges of the planar member.

16. The adjustable writing board according to claim 15, wherein the first station and the second station are between the two side edges of the planar member and the one or more supporting stands.

17. The adjustable writing board according to claim 10, further comprising a press button on at least one of the first station or the second station.

18. The adjustable writing board according to claim 10, wherein the plurality of stoppers are spring loaded, and wherein the plurality of stoppers is configured to retract under pressure from the wheel roller and block the wheel roller, when the wheel rollers roll toward the stoppers, and contract after the wheel roller pass the plurality of stoppers.

19. The adjustable writing board according to claim 10, wherein each of the first station and the second station comprises at least five stoppers configured to block and release the wheel roller.

20. The adjustable writing board according to claim 10, wherein three or more stoppers are in contact with the wheel roller.

* * * * *